United States Patent [19]

Bromley et al.

[11] Patent Number: 4,544,686

[45] Date of Patent: Oct. 1, 1985

[54] COATING COMPOSITIONS

[75] Inventors: Charles W. Bromley, Buckinghamshire; Brian A. Cooke, Surrey; Norman A. Coombes, Berkshire, all of England

[73] Assignee: Imperial Chemical Industries PLC, London, England

[21] Appl. No.: 615,274

[22] Filed: May 30, 1984

[30] Foreign Application Priority Data

Jun. 7, 1983 [GB] United Kingdom ............... 8315609

[51] Int. Cl.[4] ................ C09D 3/58; C09D 3/81; C09D 5/02
[52] U.S. Cl. ................ 523/411; 427/156; 523/100; 523/402; 523/409; 523/412
[58] Field of Search ........... 523/100, 402, 409, 411, 523/412; 427/156

[56] References Cited

U.S. PATENT DOCUMENTS

| | | | |
|---|---|---|---|
| 3,617,458 | 11/1971 | Brockman | 523/411 |
| 3,945,963 | 3/1976 | Levine et al. | 523/412 |
| 3,970,628 | 7/1976 | Connelly et al. | 523/412 |
| 4,021,396 | 5/1977 | Wu | 523/412 |
| 4,129,610 | 12/1978 | Kobayashi et al. | 523/402 |
| 4,200,671 | 4/1980 | Krajewski et al. | 427/156 |
| 4,289,674 | 9/1981 | Christenson et al. | 523/100 |
| 4,390,658 | 6/1983 | Graetz et al. | 524/512 |
| 4,446,258 | 5/1984 | Chu et al. | 523/100 |
| 4,476,263 | 10/1984 | Owens | 523/100 |

FOREIGN PATENT DOCUMENTS

| | | | |
|---|---|---|---|
| 2476108 | 8/1981 | France | 523/409 |
| 976963 | 12/1964 | United Kingdom | 523/411 |
| 2039497 | 8/1980 | United Kingdom . | |
| 2102807 | 2/1983 | United Kingdom | 523/402 |

*Primary Examiner*—Ronald W. Griffin
*Attorney, Agent, or Firm*—Cushman, Darby & Cushman

[57] ABSTRACT

A washcoat composition suitable for application to tin-plated mild steel consists of an aqueous carrier medium and a binder comprising specified relative proportions of (A) a thermosetting acrylic polymer in the form of a sterically stabilized dispersion in the aqueous medium and (B) an epoxy resin, the composition additionally containing an acid catalyst, in particular phosphoric acid or chromic acid or an ammonium or amine salt thereof.

14 Claims, No Drawings

COATING COMPOSITIONS

This invention relates to compositions suitable for the production of exterior or interior protective coatings upon two-piece or three-piece cans made from tin-plated mild steel, in particular such cans used for the packaging of food-stuffs.

In the making of two-piece cans, the cylindrical body of the can and the base are produced as a single piece (referred to as the "shell") by the drawing of suitable blanks of tin-plated mild steel, the lid constituting the second piece. In the course of this drawing operation, the tin coating is rendered very thin, particularly on the walls of the shell, and can suffer localised breakdown, whereby small areas of the steel are then exposed, constituting potential corrosion sites. It is customary, therefore, to apply to the can body, after drawing, a suitable protective coating.

In order to facilitate the drawing operation, the metal blank and the dies used are usually lubricated with a water-dispersed oil and some of this lubricant remains adhering to the exterior surface of the can after forming. For the satisfactory subsequent application to that surface of a protective coating composition, it is necessary that this lubricant should be removed. Suitable washing procedures are commonly employed for this purpose.

The coating is applied to the can from a composition which is termed a "washcoat" and is usually a clear, water-borne coating composition of about 10% resin solids content, whereby a coating thickness of about 2 microns is achieved on the shell exterior. Although water-borne, such compositions conventionally contain proportions of water-miscible organic coupling solvens such as butanol, or 2-butoxy-ethanol. These solvents may assist in removing any last traces of lubricant left upon the can surface after the washing treatment, but they are volatilised when the coating is subsequently stoved and thus tend to offset the environmental advantages inherent in the use of a water-borne composition.

A satisfactory washcoat must meet a number of additional requirements beyond that of providing a continuous, integrated coating upon the exterior surface of the can shell. Firstly, the coating produced after the initial stoving operation must be flexible enough not to be damaged during the subsequent operations in the can factory of forming a flange and beads on the shell. Secondly, the coating must be hard enough to withstand impact with adjacent cans on the foodstuff-canning production line, but it must at the same time possess sufficient "slip" to avoid the cans jamming on the line. Thirdly, the coating must be compatible with any lacquer which is subsequently to be applied to the interior of the can (since it is possible for some of the washcoat to splash up inside the can during its application). Fourthly, the coating must be able to withstand the autoclave conditions to which the can and its foodstuff contents will be subjected for sterilisation purposes. Fifthly, the coating must show good humidity resistance over a longer period of time than that encountered during autoclaving. In these last two respects, it is required that the coating should not break down, with the consequent development of rust spots or pitting, and preferably it should not undergo whitening, staining or any loss of gloss.

Some can manufacturers have introduced into the shell-washing procedure a pre-treatment operation whereby the corrosion protection conferred by the application of the washcoat is enhanced. This may, for example, consist in treatment of the shell with an alkali-chromate mixture.

We have now devised a water-borne washcoat especially suitable for two-piece cans which provides a protective coating therefor meeting the foregoing requirements, which at the same time effects an anticorrosion 'pretreatment' of the shell exterior and which, notwithstanding that it is free from objectionable organic coupling solvents, is very effective for removing the last traces of lubricant remaining from the shellforming operation.

According to the present invention we provide a washcoat composition suitable for application to tin-plated mild steel, consisting of an aqueous carrier medium and a binder comprising (A) from 70% to 98% by weight of a thermosetting acrylic polymer which is present as a sterically stabilised dispersion in the said aqueous medium, and (B) from 2% to 30% by weight of an epoxy resin; and which additionally contains from 0.1% to 10% by weight, based on the total binder, an acid catalyst.

By "acrylic polymer" we mean a polymer or copolymer of an alkylester of acrylic acid or methacrylic acid, such as methyl methacrylate, ethyl methacrylate, butyl methacrylate, lauryl methacrylate, ethyl acrylate, butyl acrylate, hexyl acrylate, n-octyl acrylate, 2-ethylhexylacrylate and lauryl acrylate, optionally together with other monomers such as acrylic acid and methacrylic acid and their nitriles and amides, vinyl monomers such as styrene, vinyltoluene, vinyl acetate, vinyl chloride and vinylidene chloride.

Since the acrylic polymer is required to be of the thermosetting type, it must contain groupings whereby it is capable of undergoing crosslinking on stoving of the composition after it has been applied to a substrate. Such crosslinking may occur with the aid of an external crosslinking agent, in which case the acrylic polymer will contain, for example, hydroxyl or carboxyl groups derived from the use as comonomers of hydroxyalkyl esters of acrylic acid or methacrylic acid, such as hydroxyethyl acrylate, hydroxyethyl methacrylate or hydroxyisopropyl methacrylate, or of acrylic acid or methacrylic acid itself. The external crosslinking function may be supplied either by an epoxy resin already present in the composition or by an added conventional crosslinking agent such as a melamineformaldehyde condensate. Alternatively, the crosslinking capacity may be built into the acrylic polymer itself through the use of comonomers carrying groups which can themselves generate crosslinks under the influence of an acid catalyst; examples of such monomers include N-butoxymethyl acrylamide, N-isobutoxymethylacrylamide and the corresponding methacrylamide derivatives. The catalytic effect may be provided solely by the acid catalyst component present in the composition, but it may be desirable also to incorporate carboxyl groups into the polymer by employing acrylic acid or methacrylic acid as a comonomer, as already mentioned.

Within these constraints, the monomers to be employed may be chosen, according to principles well known to those skilled in the art, in order to produce an acrylic polymer having specified characteristics, e.g. a particular glass transition temperature (Tg). A preferred acrylic polymer has the monomer composition methyl methacrylate/butyl acrylate/N-butoxymethylacrylamide/methacrylic acid 56.1/34.4/6.7/2.8.

Sterically stabilised aqueous polymer dispersions suitable as component (A) of the composition may conveniently be made by the process described in British Patent Application No. 2039497A. Essentially this process consists in the free radical-initiated polymerisation of the monomer mixture in an aqueous medium as hereinafter defined at a temperature which is at least 10° C. higher than the Tg of the polymer, in the presence in the aqueous medium as steric stabiliser of a block or graft copolymer which contains in the molecule a polymeric component of one type which is solvatable by the aqueous medium and a polymeric component of another type which is not solvatable by the aqueous medium and is capable of becoming associated with the polymer particles formed, the concentration of free monomer in the polymerisation mixture being maintained throughout at a level such that at no time does the free monomer form a separate phase. According to the process as described in the above-mentioned specification, the total amount of monomer mixture polymerised is such that the resulting dispersion contains 20% or more by weight of polymer. It is not essential, for the purposes of the present invention, that this should be so, but for reasons of economical working it may be convenient to aim at a moderately high solids content for the dispersion. As discussed below, however, such a dispersion would normally be diluted with water to a substantial extent on being blended with the other constituents of the composition.

The aqueous medium employed in the abovedescribed polymerisation procedure is a mixture comprising (a) at least 30% by weight of water and (b) not more than 70% by weight of a second constituent which is miscible with water, the nature and proportion of the second constituent being such that the aqueous medium as a whole is capable of dissolving the monomer mixture to the extent of at least 3% by weight but is a non-solvent for the polymer formed. The use of the term "aqueous medium" does not imply that water should always be the major constituent of the medium in which the monomer mixture is polymerised; however, as high a proportion of water as possible is employed, consistent with the aqueous medium being capable of dissolving the monomer mixture at least to a sufficient extent to avoid the existence of a separate monomer phase. In practice, water will usually constitute 30-70% by weight of the aqueous medium.

Substances which are suitable as the second, water-miscible constituent of the aqueous medium include in particular the lower alcohols containing from 1 to 4 carbon atoms; the preferred alcohol is methanol, but ethanol is also very suitable.

Preferably, the temperature of polymerisation of the monomer mixture is at least 20° C., more preferably at least 30° C., higher than the Tg of the polymer which is to be formed.

Further details of the above-mentioned polymerisation procedure are given in the British patent application already referred to, including in particular details of the block or graft copolymer stabiliser which is required to be present during the polymerisation in order that the necessary steric stabilisation of the polymer particles formed may be effected. Preferably the stabiliser is, as there described, formed in situ during the polymerisation by introducing into the reaction mixture, before polymerisation begins, a "stabiliser precursor" which contains in the molecule a polymeric component which is solvatable by the aqueous medium and an unsaturated grouping which is capable of copolymerising with the monomer mixture. Particularly suitable stabiliser precursors are the acrylic or methacrylic esters of polyethylene glycols or their monoalkyl ethers, of molecular weight in the range 1000-4000. The proportion of stabiliser precursor used is typically in the range 0.5-20%, more especially 2-10%, by weight of the polymer content of the dispersion being made. The copolymerisation of the precursor with a minor proportion of the monomer mixture, during the polymerisation of the latter, leads to the production of the block or graft copolymer stabiliser having the characteristics hereinabove defined.

After completion of the polymerisation, the resulting dispersion may if desired be submitted to a stripping operation at atmospheric pressure or under vacuum to remove the methanol or ethanol used as the second constituent of the aqueous medium, leaving a wholly aqueous continuous phase, but for the purposes of the present invention this is not essential and it may, indeed, be an advantage to allow the alcohol to remain in order to facilitate the subsequent blending of the dispersion with the other constituents of the composition (see below).

For the purposes of the present invention, the Tg of the acrylic polymer is not a critical factor, the requirement being simply that the film-forming material in the composition should possess coalescence capability after application to the substrate. In practice, acrylic polymers having a Tg below room temperature are satisfactory.

Epoxy resins suitable as component (B) of the compositions of the invention are conventional bisphenol A-epichlorhydrin condensates possessing unreacted epoxide groups, having the general formula

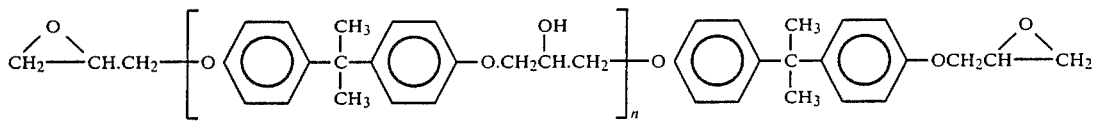

where n may have any value from zero up to about 12.

A preferred epoxy resin is "Epikote 828" (Registered Trade Mark), which is both compatible with many acrylic polymers and soluble in the original methanol/water continuous phase of the dispersions made as described above. "Epikote 1001" and "Epikote 1004" are also suitable, however. These have average compositions corresponding to the above formula where n is 0.1, 2 and 3.7 approximately.

Preferably the binder component of the compositions contains from 80% to 95% by weight of the acrylic polymer and from 5% to 20% of the epoxy resin.

The third essential constituent of the composition is, as already stated, an acid catalyst. Suitable catalysts include phosphoric acid, chromic acid and the ammonium or amine salts thereof. The preferred acid is phosphoric acid ($H_3PO_4$); where a substantially neutral product is desired, the composition containing phosphoric acid may be brought to a pH of 6-9 by addition of ammonia or an amine, such as N,N-dimethylaminoethanol, without any significant effect upon the properties of the final film. Chromic acid (H₂CrO₄, i.e. chromium trioxide dissolved in water) is also very suitable in place of phosphoric acid. Also of interest is a combination of phosphoric acid and chromium trifluoride of the composition H₃PO₄: CrF₃.4H₂O in the weight ratio 3:2. Preferably the acid constituent is used in an amount of from 0.5% to 5% of the total binder weight.

Other substances which may be incorporated in the compositions include surfactants, thickeners and slip aids. A suitable surfactant is sodium dioctylsulphosuccinate, used at a level of about 0.01%-0.5% solids (based on the total weight of the composition). Suitable thickeners, preferably of the non-ionic type, include "Primal" RM8 ("Primal" is a Registered Trade Mark) and guar gum, these being used at a level of about 0.01%-0.1% (on the same basis). The presence of these materials assists the wetting of the substrate by the composition and the production of an unbroken film over the whole of the surface to be coated, but the amounts used should be kept at a minimum consistent with achieving these objectives, otherwise the humidity resistance of the final coating may be impaired. Suitable slip aids are aqueous dispersions of hydrocarbon waxes, of which "Lanco Glidd" W (ex. Capricorn Chemicals; "Lanco Glidd" is a Registered Trade Mark) may be mentioned as an example.

In preparing the compositions of the invention, the dispersion of the acrylic polymer may be made separately and then blended with the epoxy resin and the other constituent(s). We have, however, found that the epoxy resin may with advantage be introduced during the preparation of the acrylic polymer dispersion by adding it to the polymerisation mixture along with the acrylic monomer, in particular during the final feed thereof. We have found it satisfactory to add the epoxy resin simply as such, but we have also obtained a good result by converting the epoxy resin first to a derivative which is capable of copolymerising with the acrylic monomers, for example the product of reaction of the resin with acrylic acid or methacrylic acid. It is possible that some chemical bonding results between the epoxy resin and the acrylic polymer even when the resin is introduced as such, but the invention is not to be understood as being limited to those cases where such bonding can be shown to have taken place. Where the epoxy resin is added to the fully pre-formed acrylic polymer dispersion, careful selection of the resin may be necessary in order to avoid problems of incompatibility.

The compositions of the invention may be applied to a tin-plated mild steel substrate by any suitable method, but, for the coating of cans, curtain coating or dipping are preferred.

Adequate protection can be achieved with mean dry film thicknesses as low as 1.0-2.0 μm, which correspond to a coating weight in the region of 35-70 mg for a standard-sized can having an exterior surface area of 330 cm².

Following such application, the substrate and coating are stoved at a temperature and for a period of time sufficient to bring about crosslinking of the acrylic polymer. Where the substrate is a two-piece can, the preferred procedure is to give the exterior-coated shell an initial bake for about 1½ minutes to attain a peak metal temperature of about 200° C., in order to dry the film without fully crosslinking it; when this is done, any intended application of lacquer to the interior of the shell is then carried out and finally the shell is baked a second time for about 2½ minutes with a peak metal temperature of about 200° C. so as to cure the interior lacquer and also complete the crosslinking of the exterior coat.

The compositions of the invention are particularly valuable for application to articles formed by drawing of tin-plated mild steel, in view of the tendency, as already mentioned, for the tin coating on such articles to be damaged during the drawing operation. However, the compositions may be used with advantage on any articles composed of the material in question, for example on three-piece cans even though no drawing operation is involved in their manufacture, and the compositions may be employed on the interior surfaces as well as the exterior surfaces of both types of can.

The invention is illustrated by the following Examples, in which parts and percentages are by weight.

EXAMPLE 1

I. Preparation of epoxy resin-modified sterically stabilised aqueous acrylic polymer dispersion To a 5-liter flask, fitted with stirrer, thermometer, inert gas inlet and reflux condenser with provision for feeding ingredients into the returning distillate, there was charged:

| Charge A | |
|---|---|
| Distilled water | 1017.5 parts |
| Ethanol | 817.5 parts |
| Methacrylic acid ester of monomethyl ether of polyethylene glycol mol. wt. 2000 (27% solids solution in ethanol) | 180.5 parts |

This charge was raised to reflux temperature (81° C.) and there was then added:

| Charge B | |
|---|---|
| Methyl methacrylate | 76.5 parts |
| Butyl acrylate | 48.1 parts |
| Azodiisobutyronitrile | 2.5 parts |

Refluxing was continued for 30 minutes, during which time a 'seed' polymer dispersion was formed. There was then commenced the dropwise addition, into the returning distillate, of the following mixture:

| Charge C | |
|---|---|
| Methyl methacrylate | 599.2 parts |
| Butyl acrylate | 359.4 parts |
| N—Butoxymethylacrylamide (60% solution in butanol) | 125.4 parts |
| Methacrylic acid | 31.0 parts |
| Methacrylic acid ester solution (as in Charge (A) above) | 148.1 parts |
| Azodiisobutyronitrile | 16.75 parts |

The addition of this charge occupied 3 hours; when it was complete, there was added in the same manner over a period of 1 hour the following mixture:

| Charge D | |
|---|---|
| Methyl methacrylate | 55.2 parts |
| Butyl acrylate | 34.5 parts |

| -continued | |
|---|---|
| Charge D | |
| N—Butoxymethylacrylamide (60% solution in butanol) | 12.1 parts |
| Methacrylic acid | 2.75 parts |
| "Epikote" 828 (ex Shell Chemical Co.) | 140.6 parts |
| Azodiisobutyronitrile | 3.25 parts |

Thirty minutes after this final feed was complete, there was added 2 parts of azodiisobutyronitrile (slurried in about 10 parts of the returning distillate). After a further 30 minutes at reflux temperature, a further 2 parts of azodiisobutyronitrile was added similarly. Finally, reflux temperature was maintained for 30 minutes more and the ethanol present was then removed from the polymerisation mixture by distillation at atmospheric pressure. There was thus obtained a stable dispersion the disperse phase of which had the weight composition methyl methacrylate/butyl acrylate/N-butyoxymethylacrylamide/methacrylic acid/"Epikote" 828 50.5/31/6/2.5/10. The latex had a solids content of 50.4%, a high shear viscosity of 1.2 poise and an average particle size of 0.47 micron (as measured on the "Nanosizer" instrument marketed by Coulter Electronics Ltd: "Nanosizer" is a Registered Trade Mark). The acrylic polymer component of the disperse phase had a Tg (calculated) of 20° C.

II. Preparation of wash-coat composition

| Component A | |
|---|---|
| The following ingredients were blended:- | |
| Epoxy resin-modified acrylic dispersion (as in (I) above) | 23 parts |
| Deionised water | 50 parts |
| 10% Phosphoric acid solution, neutralised with dimethylaminoethanol | 2.2 parts |
| Aqueous carnauba wax dispersion | 0.25 part |
| Component B | |
| The following ingredients were blended:- | |
| Guar gum (0.4% solution) | 1 part |
| Sodium dioctylsulphosuccinate (10% solution) | 1.5 parts |
| Deionised Water | 22.1 parts |

Component B was then added to Component A with stirring so as to produce a homogeneous composition. The washcoat so obtained had a solids content of approximately 12% by weight.

III. Application of composition to substrate

Under production conditions, on a can-manufacturing line, a washcoat is normally applied to the cans by means of a double or triple curtain procedure, the curtains of washcoat composition being produced by overflowing from troughs which are continuously being replenished. For laboratory testing, when limited amounts of a composition are available, the washcoat can be applied to tin-plate samples by brushing, but we have found that production application may be satisfactorily simulated by applying the composition from a laboratory wash-bottle to a can placed in an inverted position on a metal grid, supported over a suitable receptacle for drainage. Any excess washcoat lying on the base of the can is readily removed by a current of air delivered from a fish-tail nozzle and any excess remaining on the rim of the can may be removed by dipping the rim in a shallow dish of water. This procedure uses about 100 ml of washcoat per can, which is the approximate amount applied on the production line.

The composition prepared as described in part I was applied to a standard two-piece tin-plate can shell by the above procedure, and the can was then baked at an oven temperature of 200° C. for 4 minutes. The resulting coating withstood autoclave conditions of 121° C. at 15 p.s.i. for 1 hour without significant blushing, whitening or breakdown. When exposed in a humidity cabinet at 42°-48° C., 100% relative humidity, for 72 hours, the corrosion protection was found to be excellent.

EXAMPLE 2

I. Preparation of epoxy resin-modified sterically stabilised aqueous acrylic polymer dispersion The procedure described in part I of Example 1 was repeated, but using somewhat different proportions of monomers, so as to give a dispersion in which the disperse phase had the weight composition methyl methacrylate/butyl acrylate/N-butoxymethylacrylamide/methacrylic acid/"Epikote" 828 42.2/39.3/6/2.5/10. The dispersion had a solids content of 39.2%, a high-shear viscosity of 0.5 poise and an average particle size ("Nanosizer") of 0.23 micron. The acrylic polymer component of the disperse phase had a Tg (calculated) of 10° C.

III. Preparation of washcoat composition and application

The following ingredients were blended:

| Epoxy resin-modified acrylic dispersion (as in (I) above) | 25.5 parts |
|---|---|
| Chromium trifluoride/phosphoric acid solution (see below) | 2.0 parts |
| Deionised water | 72.5 parts |

The chromium trifluoride/phosphoric acid solution used had the composition:

| Chromiumtrifluoride, $CrF_3 4H_2O$ | 5.0 parts |
|---|---|
| Phosphoric acid (81% solution) | 9.26 parts |
| Deionised water | 85.74 parts |

The above blended ingredients were applied by brush to tin-plate strips cut from a two-piece food can and the coated strips were then stoved for 4 minutes at 200° C. The resulting coating showed excellent corrosion protection when the coated strips were exposed in a humidity cabinet at 42°-48° C. and 100% relative humidity for 72 hours.

EXAMPLE 3

I. Preparation of epoxy resin-modified sterically stabilished aqueous acrylic polymer dispersion (a) To a 2-liter reaction vessel fitted with a stirrer, reflux condenser and thermometer was charged:

| "Epikote" 1001 (ex Shell Chemical Co.) | 430 parts |
|---|---|
| Tert-butyl catechol | 0.1 part |
| Methyl isobutyl ketone | 700 parts |
| Dimethylbenzylamine | 3.2 parts |

The charge was heated to 81° C. by means of an electric heating mantle and was stirred until all the "Epikote" resin had dissolved. Methacrylic acid (38 parts) was then added slowly to the mixture over a two-hour period, the temperature being maintained at 96°–98° C. After completion of the addition, heating was continued for a further 8 hours at the same temperature.

The product was an 86.2% solids by weight solution of the adduct of methacrylic acid and the "Epikote" resin. By titration it was established that 94.7% of the methacrylic acid taken had reacted and that formation of the adduct was 90.6% complete.

(b) To a 2-liter reaction vessel fitted with stirrer, thermometer, inert gas inlet and reflux condenser with provision for feeding ingredients into the returning distillate there was charged:

| Charge A | |
|---|---|
| Distilled water | 315 parts |
| Methanol | 500 parts |
| Methacrylic acid ester of monomethyl ether of polyethylene glycol mol. wt. 2000 (100% solids) | 19.5 parts |

The charge was heated to 58° C. and there was then added:

| Charge B | |
|---|---|
| Methyl methacrylate | 30.7 parts |
| Butyl acrylate | 19.3 parts |
| Azodiisobutyronitrile | 1.0 parts |

The temperature was raised to that of reflux (72° C.) and held there for 30 minutes, during which time a 'seed' polymer dispersion was formed. There was then commenced the dropwise feed, into the returning distillate, of the following mixture:

| Charge C | |
|---|---|
| Methyl methacrylate | 224.6 parts |
| Butyl acrylate | 139.9 parts |
| N—Butoxymethylacrylamide (60% solution in butanol) | 49.7 parts |
| Methacrylic acid | 12.4 parts |
| Methacrylic acid ester (as in Charge (A) above) | 16.0 parts |
| Azodiisobutyronitrile | 6.7 parts |

The addition of charge C occupied 3 hours. When this was complete, there was added in the same manner, over a period of one hour, the following mixture:

| Charge D | |
|---|---|
| Methyl methacrylate | 27 parts |
| Butyl acrylate | 16.8 parts |
| N—Butoxymethylacrylamide (60% solution in butanol) | 5.3 parts |
| Methacrylic acid | 1.3 parts |
| Solution of "Epikote" resin adduct (from (a) above) | 46.2 parts |
| Azodiisobutyronitrile | 1.3 parts |

Refluxing was then continued for 30 minutes and 0.8 part of azodiisobutyronitrile was added (as a slurry in about 10 parts of the returning distillate). After a further 30 minutes, 0.8 part more of azodiisobutyronitrile was added similarly. Finally, after 30 minutes more under reflux, the methanol present was distilled off. A stable, aqueous dispersion resulted the disperse phase of which had the weight composition methyl methacrylate/butyl acrylate/N-butoxymethylacrylamide/methacrylic acid/"Epikote"-methacrylic acid adduct 50.2/31.3/6/2.5/10. The dispersion had a solids content of 48.8% and a high-shear viscosity of 1.4 poise. The average particle size was 0.26 micron ("Nanosizer" determination). The acrylic polymer component of the disperse phase had a Tg (calculated) of 20° C.

II. Preparation of washcoat composition and application

| Epoxy resin-modified acrylic dispersion (as in (I) above) | 25.5 parts |
|---|---|
| Chromium trifluoride/phosphoric acid solution (as in part II of Example 2) | 2.0 parts |
| Deionised water | 77.5 parts |

The washcoat obtained by blending the above ingredients was applied to tin-plate strips as described in Example 2. On testing in the humidity cabinet for 72 hours, the coating remained clear and only very slight rust spotting was observed.

EXAMPLE 4

I. The procedure described in part I of Example 3 was repeated, but using a different monomer mixture such that the disperse phase of the dispersion had the weight composition methyl methacrylate/butyl acrylate/styrene/N-butoxymethylacrylamide/methacrylic acid/"Epikote"-methacrylic acid adduct 50.9/23.6/7/6/2.5/10. The dispersion had a solids content of 46.1%, a high-shear viscosity of 1.6 poise and an average particle size ("Nanosizer") of 0.29 micron. The acrylic polymer component of the disperse phase had a Tg (calculated) of 36° C.

II. A washcoat was prepared as described in part II of Example 3, but substituting the dispersion there referred to by an equal weight of the dispersion described in part II above.

On testing as in Example 3, a similar result to that described in that Example was obtained.

EXAMPLE 5

A washcoat was prepared by blending the following ingredients:

| Epoxy resin-modified acrylic dispersion (as described in part I of Example 1) | 25.38 parts |
|---|---|
| Deionised water | 74.32 parts |
| Phosphoric acid, 10% solution | 0.30 part |

The blend had a pH of 2.92 and a solids content of 10%. When applied to tin-plate strip and tested as described in Example 2, this composition gave a coating which exhibited good humidity resistance with the development of only a small number of very small rust spots.

EXAMPLE 6

The following ingredients were blended to give a component A:

| | |
|---|---|
| Epoxy resin-modified acrylic dispersion (as described in part I of Example 1) | 23.8 parts |
| Deionised Water | 50.0 parts |
| 5% Chromic acid solution neutralised with dimethylaminoethanol | 4.0 parts |

The following ingredients were also blended to give a component B:

| | |
|---|---|
| Sodium dioctylsulphosuccinate (10% solution) | 1.5 parts |
| Deionised water | 19.5 parts |
| Guar gum, 0.2% solution | 2.0 parts |

Component B was then added to component A with stirring. The resulting washcoat composition was applied to tin-plate cans as described in part III of Example 1. The coating obtained showed excellent autoclave and humidity resistance.

EXAMPLE 7

The following ingredients were blended to give a component A:

| | |
|---|---|
| Epoxy resin-modified acrylic dispersion (as described in part I of Example 1) | 20.9 parts |
| Deionised water | 50.0 parts |
| 10% Phosphoric acid solution | 4.0 parts |
| Hydrocarbon wax dispersion ("Lanco Glidd" W) | 1.0 parts |

The following ingredients were blended to give a component B:

| | |
|---|---|
| Sodium dioctylsulphosuccinate (10% solution) | 0.25 part |
| "Primal" RM8 (0.2% solution) | 0.25 part |
| Deionised water | 23.6 parts |

Component B was then added to component A with stirring. The resulting washcoat composition was applied to tin-plate cans in the manner described in part III of Example I. The coating obtained showed good humidity resistance.

We claim:

1. A washcoat composition suitable for application to tin-plated mild steel, consisting of an aqueous carrier medium and a binder comprising
   (A) from 70% to 98% by weight of a thermosetting acrylic polymer which is present as a sterically stabilised dispersion in the said aqueous medium, and
   (B) from 2% to 30% by weight of an epoxy resin; and which additionally contains from 0.1% to 10% by weight, based on the total binder, of an acid catalyst.

2. A composition as claimed in claim 1, wherein the acrylic polymer (A) has the monomer composition methyl methacrylate/butyl acrylate/N-butoxymethylacrylamide/methacrylic acid in the weight ratios 56.1/34.4/6.7/2.8 respectively.

3. A composition as claimed in claim 1, wherein the acrylic polymer (A) is made in dispersion by the free radical-initiated polymerisation of monomers, in an aqueous medium which is a mixture comprising (a) at least 30% by weight of water and (b) not more than 70% by weight of a second, water-miscible constituent and which as a whole is capable of dissolving the monomers to the extent of at least 3% by weight but is a non-solvent for the polymer formed, the polymerisation being carried out at a temperature which is at least 10° C. higher than the Tg of the polymer, in the presence in the aqueous medium as steric stabiliser of a block or graft copolymer which contains in the molecule a polymeric component of one type which is solvatable by the aqueous medium and a polymeric component of another type which is not solvatable by the aqueous medium and is capable of becoming associated with the polymer particles formed, the concentration of free monomer in the polymerisation mixture being maintained throughout at a level such that at no time does the free monomer form a separate phase.

4. A composition as claimed in claim 3, wherein the second, water-miscible constituent of the aqueous medium is methanol or ethanol.

5. A composition as claimed in claim 3, wherein the temperature of polymerisation is at least 20° C. higher than the Tg of the acrylic polymer being formed.

6. A composition as claimed in claim 3, wherein the steric stabiliser is formed in situ during the polymerisation from a precursor which is the acrylic or methacrylic ester of a polyethylene glycol, or a monoalkyl ether thereof, of molecular weight in the range 1000–4000.

7. A composition as claimed in claim 6, wherein the amount of stabiliser precursor is in the range 0.5% to 20% by weight of the polymer content of the dispersion.

8. A composition as claimed in claim 1, wherein the epoxy resin component (B) is a bisphenol A-epichlorhydrin condensate of the general formula

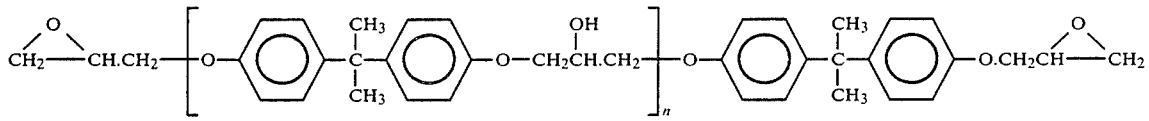

where n has a value in the range 0–12.

9. A composition as claimed in claim 1, wherein the binder consists of from 80% to 95% by weight of the acrylic polymer (A) and from 5% to 20% of the epoxy resin (B).

10. A composition as claimed in claim 1, wherein the acid catalyst is phosphoric acid or chromic acid or an ammonium or amine salt thereof.

11. A composition as claimed in claim 10, wherein the acid catalyst is present in an amount of from 0.5% to 5% of the total binder weight.

12. A composition as claimed in claim 3, wherein the epoxy resin is added to the monomers being polymerised during the preparation of the dispersion polymer (A).

13. A process for the production of a protective coating upon a tin-plated mild steel substrate comprising in applying to the substrate a washcoat composition as claimed in claim 1 and subsequently stoving the substrate and the applied coating at a temperature and for a period of time sufficient to crosslink the acrylic polymer.

14. A tin-plated mild steel substrate to which there has been applied a washcoat composition as claimed in claim 1.

* * * * *